April 21, 1970    R. A. BUSDIECKER ET AL    3,507,737
ART OF SEALING THERMALLY CRYSTALLIZABLE
GLASS, AND THERMALLY CRYSTALLIZABLE
TELESCOPE MIRROR BLANK
Filed Jan. 1966    2 Sheets-Sheet 2
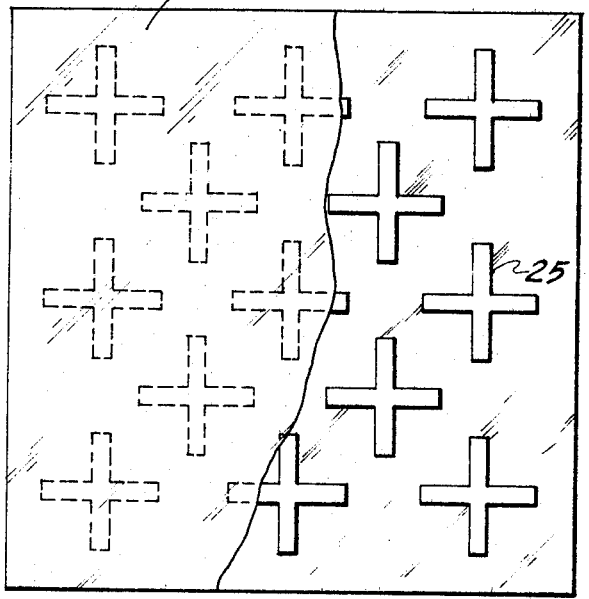
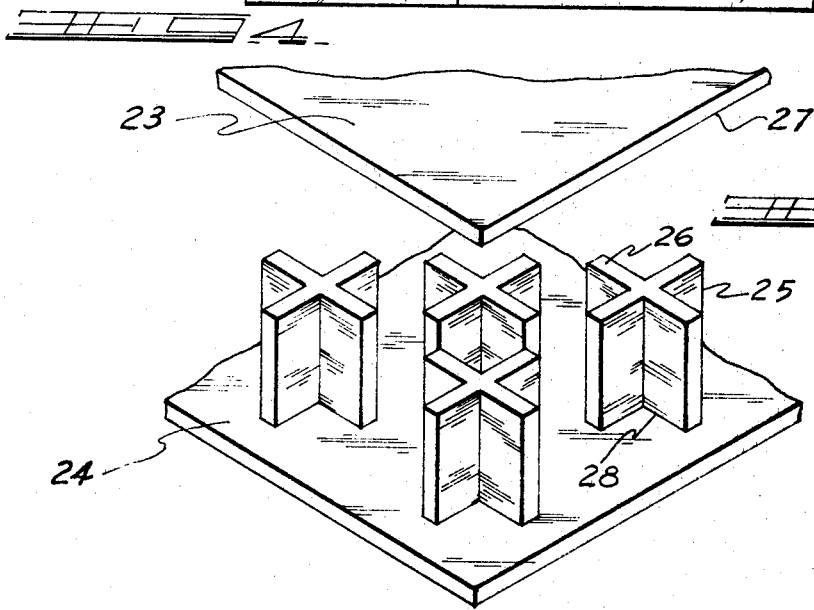
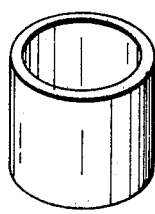
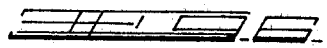
INVENTOR.
ROBERT A. BUSDIECKER
JAMES E. RAPP
BY W.A. Schaich
Charles S. Lynch United States Patent Office 3,507,737
Patented Apr. 21, 1970

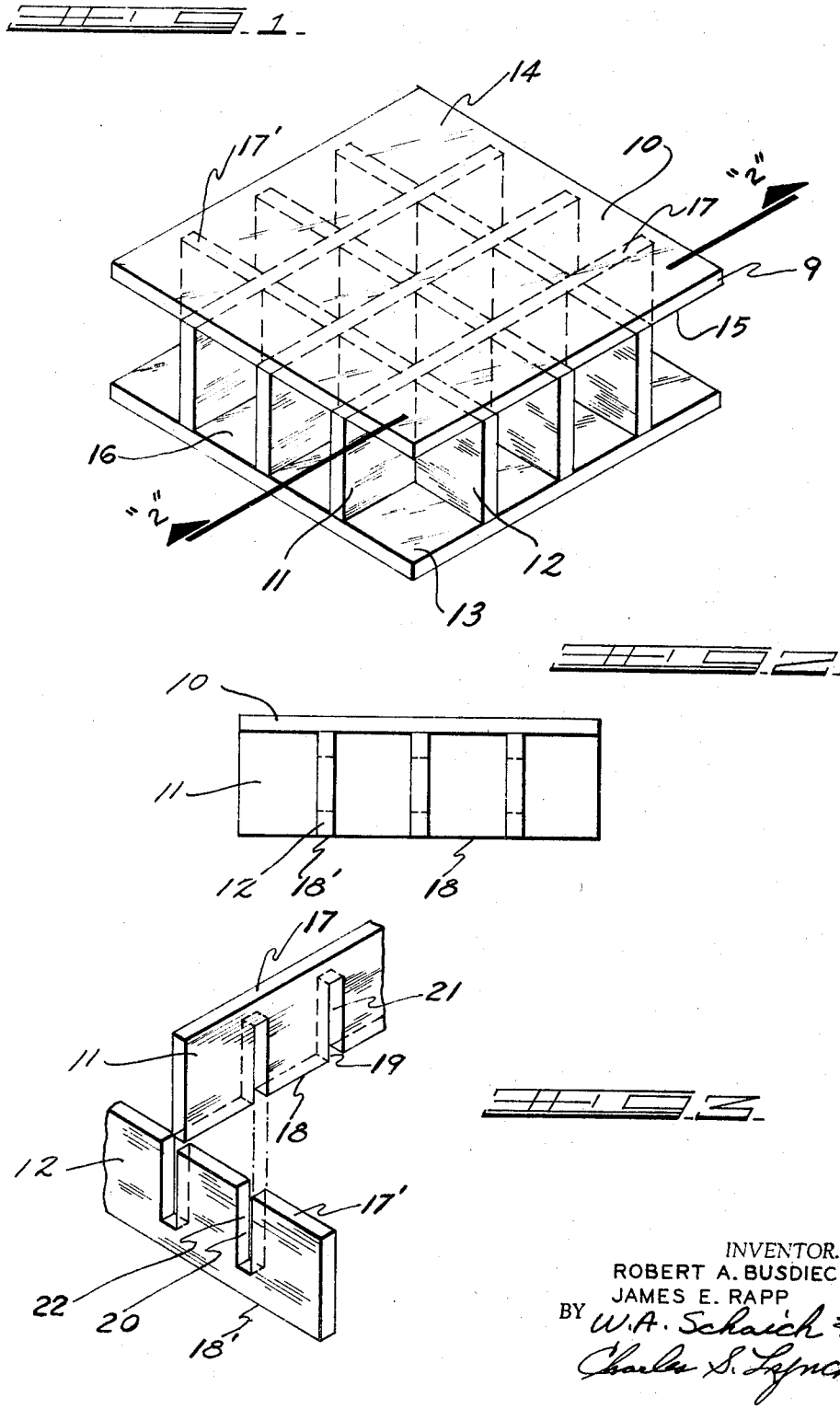

3,507,737
ART OF SEALING THERMALLY CRYSTALLIZABLE GLASS, AND THERMALLY CRYSTALLIZABLE TELESCOPE MIRROR BLANK
Robert A. Busdiecker, Woodville, and James E. Rapp, Oregon, Ohio, assignors to Owens-Illinois, Inc., a corporation of Ohio
Filed Jan. 3, 1966, Ser. No. 518,447
Int. Cl. E05f 15/20; C03b 29/00, 23/20
U.S. Cl. 161—4                                   30 Claims

ABSTRACT OF THE DISCLOSURE

Lightweight, low expansion, thermally crystallizable glass articles such as telescope mirror blanks formed of two thermally crystallized glass members having surfaces of extended areas disposed in facing relationship and at least one thermally crystallized spacing member disposed therebetween. Illustratively, the spacing members are slotted, elongated, flat members fitted together to form an "egg crate" configuration. The articles are characterized by an average lineal coefficient of thermal expansion within the range of $10 \times 10^{-7}$ to $-10 \times 10^{-7}/°$ C. (0–300° C.). Methods of sealing two thermally crystallizable glasses at low temperatures are also disclosed without obtaining premature crystallization of the glass parts. Assembled glass articles can be rapidly heated to a high temperature to avoid nucleation and to permit sealing and then lowering the temperature to obtain nucleation and subsequently carrying out a crystallization.

---

This invention relates to lightweight articles of substantial thickness made from a thermally crystallizable glass, and to a method for making such articles. More particularly, the present invention relates to telescope mirror blanks and to a method for making lightweight telescope mirror blanks from a thermally crystallizable glass.

In a further aspect, the present invention relates to lightweight, transparent, thermally crystallized glass telescope mirror blanks which are particularly valuable because of their relatively low coefficients of thermal expansion.

Special problems of a difficult nature are encountered in the manufacture of thermally crystallizable glass telescope mirror blanks, especially those of relatively large dimensions. Because the condition and the configuration of the reflecting face surface of the finished mirror determines the accuracy of the reflected image, and because the mirror must be of sufficient rigidity so as to prevent even the slightest movement or distortion of the reflecting mirror surface, the thickness of the mirror must be substantial in order to insure sufficient strength and rigidity. Increasing thickness brings added weight which further complicates the already complex problems involved in supporting large mirrors.

Since the ratio of the diameter of the mirror blank to the thickness thereof is usually approximately six to one, it is readily evident that a mirror blank of one, two, four or even six hundred inches in diameter comprises a large amount of glass in terms of size and weight. Casting such a mirror blank of fused silica, borosilicate glass or other known glass materials involves a long, tedious process. The problems encountered with respect to cooling and annealing the glass to insure uniform expansion characteristics being imparted to all portions thereof are staggering. Of course, any variation in the expansion characteristics of one area of the glass with respect to another area will adversely affect the reflecting surface and the quality of the image being observed therefrom. It is important that the coefficent of thermal expansion be as low as possible and, ideally, be zero, so that little or no expansion occurs when the mirror is exposed to varying temperatures during use of the telescope.

Attempts have been made in the past to decrease and lessen the over-all weight of such telescope mirrors by forming a mirror blank of a minimum thickness and then subsequently bonding the under surfaces of the mirror blank to glass members of the same composition, which glass members as a whole impart a certain rigidity to the ultimate reflecting mirror. One example of this is the use of so-called "egg crate" construction wherein a plurality of elongated, usually rectangular, glass strips having spaced slotted portions along one longitudinally extending edge are interconnected with a plurality of similar glass strips extending at right angles thereto, the connection being at the respective slotted portions so that the final structure is of the same thickness or height as the individual strip, just as is the case of the interconnected cardboard members used with an egg crate to separate the individual eggs.

However, due to the over-all size of the glass strips and the thickness of the mirror blank, considerable problems occur when the glass strips are subjected to temperatures sufficient to fuse them together along adjoining portions and also fuse the upper surface of the interlocked egg crate structure to the bottom surface of the mirror blank. A glass backup plate of sufficient thickness to impart rigidity to the mirror is usually also fused to the other surface of the egg crate structure. Since the formation or construction of mirrors is a very delicate operation and the temperature to which the glass is subjected as it is being cooled has to be very carefully controlled, many difficulties have been encountered as soon as an attempt is made to fuse the egg crate glass structure to the bottom surface of the glass mirror blank and to the backup plate. To do this successfully is a tedious, time-consuming operation which adds considerably to the cost of the final product.

While such problems have existed with respect to forming mirror blanks of the "egg-crate" construction out of glass, such as that ordinarily used in making telescope mirrors, and primarily out of borosilicate glass, these problems are greatly multiplied when the mirror is to be made of a thermally crystallizable glass which is to be subsequently crystallized. Included among such problems is premature nucleation, i.e., formation of nuclei, and unwanted crystallization. Because of the high temperature necessary to fuse the components together, particularly in making mirror blanks of relatively large diameters, it has been difficult to control the heating rate and the nucleation and crystallization which occur during the heating and fusing steps, and it has been difficult to obtain a satisfactory mirror blank. It has also been difficult to seal or bond the components together while preventing nucleation and crystallization from occurring or while keeping such nucleation and crystallization to an absolute minimum.

Accordingly, it is an object of the present invention to provide a lightweight, thermally crystallized glass telescope mirror blank which overcomes these shortcomings and disadvantages which exist in the prior art.

It is a further object of the present invention to provide a method for making a lightweight, thermally crystallized glass telescope mirror blank, which method avoids the disadvantages which exist in methods used heretofore.

It is another object of the present invention to provide a method of forming a lightweight, low expansion, crystallized glass-ceramic telescope mirror blank.

Another object of the present invention is to provide a lightweight, transparent, thermally crystallized glass-ceramic telescope mirror blank having a low lineal coefficient of thermal expansion.

A further object of the invention is to provide a thermally crystallized glass telescope mirror of sufficient rigidity and size to be mounted in a telescope and having a low lineal coefficient of thermal expansion.

Still another object of the present invention is to provide other articles which are made from a thermally crystallizable glass.

Another object is to seal two thermally crystallizable glasses at low temperatures.

A further object of the present invention is to provide a method for forming other articles from a thermally crystallizable glass.

It is a further object of this invention to provide a method of sealing two thermally crystallizable glass parts along adjoining, contacting surfaces without obtaining premature crystallization of the glass parts.

In attaining the foregoing objects, one feature of the present invention resides in a method of making a telescope mirror blank having a sheet or layer of thermally crystallizable glass, the upper surface of which will be subsequently treated to form the reflecting surface of a telescope mirror, and the lower surface of which is sealed or bonded to a plurality of individual spacing members formed of thermally crystallizable glass. Each of the plurality of spacing members, in turn, has its bottom surface bonded or sealed to a surface of a second sheet or layer of thermally crystallized glass.

Another feature of one embodiment of the present invention resides in rapidly heating the assembled crystallizable glass mirror blank structure to a temperature sufficiently high to dissolve any nuclei which may have formed during the formation of the individual components and sufficiently high as to permit bonding or sealing or fusion between adjacent contacting component surfaces. The structure is maintained at this temperature until such fusion is completed. The structure is thereafter subjected to a nucleation heat treatment step at a temperature substantially lower than that of the sealing or fusing step and is crystallized to form a low expansion crystallized glass mirror blank assembly.

Another feature of this embodiment of the present invention resides in individually forming the thermally crystallizable glass parts or components of the mirror blank assembly and subjecting the parts to a quenching step to cool the glass below the annealing point. The formed glass parts are preferably cooled or quenched as rapidly as can be done without adversely thermally shocking the material, which would otherwise result in the formation of checks or other defects in the glass. This rapid cooling or quenching step minimizes the formation of nuclei when the glass passes through the nucleation temperature range. Thereafter, the members are assembled to the desired mirror blank structure and the structure hated. Once the glass is heated to above its annealing point, it is then rapidly heated to a temperature sufficient to achieve fusion of the members at their contacting surfaces and is maintained at this temperature until fusion is complete. The glass is then crystallized in the manner discussed above.

A feature of another embodiment of this invention resides in subjecting the thermally crystallizable glass mirror blank assembly to a substantially constant temperature sufficient to bond together adjoining contacting surfaces, to nucleate the bonded glass assembly and to crystallize the glass, and maintain the assembly at this temperature for a period of time sufficient to form a unitary, rigid thermally crystallized mirror blank.

Still another feature of this embodiment of the invention resides in subjecting the bonded and nucleated glass assembly to a crystallization step at a temperature which is higher than the temperature at which bonding and nucleation took place, and thus increase the rate of crystallization of the glass mirror blank assembly.

Another feature of the present invention resides in utilizing a thermally crystallizable glass of the $$SiO_2\text{—}Al_2O_3\text{—}Li_2O$$

system for the components of the mirror blank assembly and treating the glass in such a manner as to form a transparent glass-ceramic mirror blank having a low lineal coefficient of thermal expansion.

Still another feature of this invention is to seal a surface of a thermally crystallizable glass part to another surface by heating the part to above its annealing point at a normal rate to avoid thermally shocking the part and then rapidly heating the part at a rate of more than 10° C. per minute to a temperature such that the viscosity of the glass is within the range of $10^7$ to $10^9$ poises. The part is then maintained at this temperature until the surfaces are sealed. In particular, this feature of the invention is applicable to sealing a pair of adjoining, contacting surfaces of thermally crystallizable glass parts.

In a modification of the foregoing feature, the glass parts, when initially formed, are cooled or quenched without intentional protracted annealing in order to minimize nuclei formation.

We have surprisingly discovered that two thermally crystallizable glasses, especially those of the lithium alumino-silicate field, can be sealed at low temperatures by maintaining the surfaces of the glass parts in contact at temperatures which correspond to an original glass viscosity of $10^{10}$ to $10^{14}$, especially $10^{10}$ to $10^{12}$, poises for an extended period of time, while simultaneously effecting nuclearation of the glass parts. In this application, nuclearation means the separation throughout the body of the glass of a minor portion of a second phase, either as a submicroscopic crystalline phase or as a separate glassy or vitreous phase, or both. It is not known by what process sealing can be effected at such low viscosities, but it may be that the nucleation promotes sealing in some manner, such as by promoting the diffusion rates of ions in the glass. This feature of the invention makes it possible to seal thermally crystallizable glasses to each other at temperatures where crystallization rates are extremely low, so that surface crystallization is avoided.

Other objects, features and advantages of the present invention will become apparent from the following detailed description thereof taken in conjunction with the drawings, wherein:

FIG. 1 is an isometric view of one embodiment of the thermally crystallized glass telescope mirror blank of the present invention;

FIG. 2 is a sectional view of the mirror blank of the invention taken along lines 2—2 of FIG. 1;

FIG. 3 is a telescoped isometric view of a portion of a pair of spacing members and illustrating the manner in which the members are connected to each other;

FIG. 4 is a plan view of another embodiment of a transparent, thermally crystallized glass telescope mirror blank of the present invention;

FIG. 5 is an isometric, telescopic view of a portion of the mirror blank of FIG. 4; and FIG. 6 is an isometric view of still another embodiment of the spacing members suitable for purposes of this invention.

In accordance with the present invention, a telescope mirror blank is formed with a pair of oppositely disposed layers respectively sealed to a plurality of individual spacing members, which may be either separated or interconnected. As shown in FIG. 1, one embodiment of the telescope mirror blank 9 comprises an upper layer or sheet 10 of thermally crystallized glass whose under surface is sealed to an interconnected arrangement of spacing members 11, 12, also of thermally crystallized glass, and, in turn, the spacing members are sealed to a surface of another layer or sheet 13 of thermally crystallized glass. The upper surface 14 of layer 10 can subsequently be ground, polished, and figured to the desired curvature and coated with aluminum by any of the known processes to form the reflecting surface of a telescope mirror. While the layer 10 is shown in a flat, rectangular configuration, it can also be of circular or oval, or of any other desirable configuration. Likewise, while the upper surface 14 is shown flat, and can then be subsequently processed to form the reflecting mirror surface, the upper surface can originally be concave so that the subsequent processing steps can be kept to a minimum.

Each of spacing members 11, 12 is shown having a rectangular, elongated configuration with the height thereof, i.e., the distance between the bottom surface 15 of layer 10 and the upper surface 16, being substantially uniform throughout its length. This assures that the upper 17, 17' and lower 18, 18' surfaces of the spacing members 11, 12 are in full contact with the respective surfaces 15 and 16 of layers 10 and 13. Thus, spacing members 11, 12 can also be considered as support members for the plate 10 whose outer surface 14 will eventually be treated to form a reflecting mirror.

Furthermore, each of spacing members 11, 12 is provided with a number of slots 19, 20 spaced from each other and extending from one surface 18, 17' of members 11 and 12, respectively. When assembled in the manner illustrated in FIGS. 1 and 3, each of members 11 is perpendicular to each of members 12 and, because the slots 19, 20 on each spacing member are uniformly spaced, the plurality of members 11 interlock with the plurality of members 12 to form an "egg-crate" assembly.

While the size of slots 19, 20 may be precision machined and ground, this is not actually necessary for purposes of the invention. Neither is it necessary for the inner surfaces 21, 22 of slots 19 and 20 to contact the corresponding outer surfaces of spacing members 11, 12 when arranged in the manner illustrated in FIG. 1. Sufficient rigidity is imparted to the structure when only the surfaces 17, 17' and 18, 18' of members 11, 12 are sealed to the bottom surfaces 15 and 16 of layers 10, 13, respectively. However, having such surfaces 21, 22 contact and also seal to the adjoining outer edges of members 11, 12 is not detrimental and merely affords extra rigidity to the finished assembly.

In the embodiment illustrated in FIGS. 4 and 5, the upper 23 and lower 24 layers or sheets of thermally crystallizable glass are uniformly spaced from each other by a plurality of individual spacing members 25 which are of the configuration of a cross, i.e., adjoining sides meet at right angles to each other. Again, such member is of uniform height so that the upper surface 26 of each member 25 is in direct contact with the lower surface 27 of layer 23 and the lower surface 28 of each member 25 is in direct contact with the upper surface of layer 24. Such contact assures complete sealing of the spacing members to the respective surfaces of the upper and lower layers 23, 24 to produce a rigid assembly.

As will be understood by the art, the actual arrangement and numbers of the spacing members 25 in the mirror blank assembly is not important to the inventive features of the present invention. All that is necessary is that there be sufficient members 25 disposed between the layers 23, 24 to assure a rigid mirror blank assembly. Members 25 may preferably be aligned in a series of rows, as shown in FIG. 4, or they may be scattered in an arrangement other than in aligned linear rows, as in a circular or arcuate pattern. In place of spacing members 25, spacing members 29, shown in FIG. 6, may be utilized, or spacing members having other configurations than those shown. The important feature is that all spacing members which are used must be of substantially the same height to insure uniform spacing between the upper and lower sheets or layers 23, 24. A mixture of different shaped spacing members may also be used.

Likewise, the perpendicular spacing members shown in FIG. 1 can vary in their arrangement and instead of being at right angles to each other, can be set at other angles.

Further, while the grid arrangement of FIG. 1 is formed of a series of individual, slotted members 11, 12, it is within the skill of the art to make the grid of a cast, unitary structure of uniform height.

In the structure shown in FIG. 1, a number of cavities are defined by the upper and lower plates 10 and four sides of spacing members 11 and 12. When the structure is such that sealed cavities are formed between the upper and lower plates, openings may be provided in one or more walls of each cavity so that communication with the outside atmosphere may be maintained. By providing such openings in cavities which would otherwise be airtight, detrimental pressures affecting the configuration of the mirror are avoided. Further, in such a structure, the temperature within the mirror blank may be regulated by passing fluid through the openings and into the cavities. The temperature of the fluid, of course, is controlled so that the temperature within the center of the mirror blank is substantially the same as that at the outer surfaces. A method for so treating hollow members of thermally crystallizable material is disclosed in copending application Ser. No. 503,831, filed Oct. 23, 1965, assigned to the assignee of the present application, and such a method is also incorporated herein by reference.

The concept of this invention can also be utilized when the bottom surface of a top sheet or layer of thermally crystallizable glass is of convex configuration. All that is necessary is to make the upper surfaces of the spacing members of a complementary, concave configuration so that all upper surfaces of the spacing members contact the adjoining bottom convex surface of the upper layer. Of course, in such a structure, all of the spacing members will not be of the same height unless the bottom layer or sheet of the mirror blank assembly had its upper surface of a concave configuration complementary to the bottom convex surface of the upper layer so that both surfaces were, in effect, parallel with each other.

In making the thermally crystallized glass telescope mirror blank assembly, the grid, formed by spacing members 11, 12 is placed upon the upper surface of layer 13 and layer 10 is then placed upon the top of the grid to form the assembly shown in FIG. 1. The surfaces 17, 17' and 18, 18' are in adjoining contact with surfaces 15 and 16, respectively, of the top and bottom layers. The entire assembly can be placed upon a supporting member, not shown, prior to subjecting it to the heat treatment steps which will result in a rigid, unitary crystallized glass-ceramic mirror blank. While the weight of the upper layer 10 is usually sufficient to maintain pressure on surfaces 17, 17', additional pressure can be placed upon layer 10 to assist in the sealing of the adjoining surfaces of the assembly. The assembly is thereafter heated for a time and temperature necessary to effect bonding.

In the present invention, all of the components of the mirror blank assembly are formed of a thermally crystallizable glass composition. It is preferred that the glass members, after forming, be cooled by relatively rapid cooling rather than by subjecting the glass members to a protracted annealing operation. A useful procedure is to air quench the glass members to minimize nuclei formation.

Prior to assembly, the spacing members 11, 12 can have their surfaces which are to be sealed, such as 17, 17' and 18, 18', ground and polished flat for a better fit when contacting surfaces 15 and 16, which can also be ground and polished flat. A very serious problem, namely, surface crystallization, can occur during the sealing or fusing step. The surface crystallization is promoted on ground and polished, sawed or otherwise uncleaned glass surfaces and the glass crystallization on the surface is very rapid at sealing temperatures and can prevent good bonding of the parts. However, surface crystallization can be retarded by acid washing or by ion exchange (replacing $Li^+$ ions with $Na^+$ or $K^+$ ions).

After the spacing members 11, 12 and layers 10, 13 have been assembled in a support member in the manner discussed above, the assembly is heated to the temperature range in which bonding is effected in a first step to obtain glass-to-glass sealing of the parts. In a first embodiment, this sealing or fusing step is effected at a temperature range substantially above a subsequent nucleation step temperature range. In such embodiment, the assembly, after being heated to about the annealing point temperature, is rapidly heated to above the nucleation temperature of the glass and to the temperature at which the viscosity of the adjoining, contacting surfaces is such that fusion takes place and the components become fused to form the unitary mirror blank. During the rapid heating, any nuclei which may have formed in the glass are dissolved. By rapidly heating the glass to the fusion temperature, the formation of large nuclei, which are difficult to dissolve, is avoided.

The three major steps involved in the thermal processing steps are fusion, nucleation and crystallization. Although it is possible to carry out the entire process isothermally, the various steps are usually effected, as in this first embodiment, at different temperature plateaus or ranges. Conveniently, glass temperatures may be expressed in terms of the viscosity of the glass at that temperature, inasmuch as a large number of different glass compositions could necessitate identification of an equally large number of temperatures and would be impractical for present purposes. Therefore, it is most convenient to define the temperature for a specific glass in terms of the desired viscosity for working at that point. In this embodiment, the temperature range in which this high-temperature fusion step is effected is generally in the range of the temperatures where the viscosity of the glasses in poises is from about $10^9$ to about $10^7$, more usually in the range of about $10^{7.5}$ to $10^{8.5}$. In heating up to the fusion temperature step range, after reaching about the annealing point temperature by heating at a normal rate to avoid thermal shock damage, the rate of heating is preferably rapid, that is, at a rate of more than 10° C. per minute, in order to redissolve very small, incipient nuclei and to prevent the formation and growth of nuclei. Once the glass has been heated above the annealing point range, the glass can be very quickly heated because the strains have been relieved. When the fusion temperature range to be employed for the fusion step has been attained, the assembly is allowed to remain at such temperature range until fusion has been effected. The bonding of the parts takes place by fusing and some slumping, without premature surface crystallization preventing bonding.

After fusion, the bonded assembly is subjected to the thermal in situ nucleation and crystallization heat treatment schedule to bring about the proper amount of nucleation and subsequent crystallization to produce a low expansion telescope mirror blank, preferably transparent.

In this first embodiment, upon completion of fusion of adjacent surfaces, the mirror blank assembly is cooled to the nucleation step temperature range which, of course, will vary with the particular glass composition. However, when expressed in terms of glass viscosity, it is usually in a range from $10^{10}$ to $10^{14}$ poises, generally about $10^{11.5}$ poises. Of course, the fused assembly can be cooled well below the nucleation step temperature range and below the annealing point, and even to room temperature, if desired. Cooling to these low temperature points permits inspection of the glass or shipment of the parts to another site for further processing. Later, when it is desired to nucleate and crystallize the glass, it can be heated to the indicated temperatures necessary to achieve these results. After nucleation is completed, the temperature of the thermally crystallizable glass is increased to within a range where more rapid crystallization occurs, but usually not above about the $10^8$ poise temperature of the original glass. On the other hand, crystallization can be effected at the nucleation temperature in the range given by taking a longer time, especially at glass viscosities above $10^{14}$ poises. The length of time that is necessary for fusion, nucleation and crystallization to take place will vary with composition, and with the size of the article, such as a telescope mirror blank, which is being produced. While from 2 to 100 hours may be adequate for a small mirror blank, 1000, 3000 or even more hours will be necessary for a telescope mirror blank seveal hundred inches in diameter and having a thickness of about one-sixth of the diameter. This is necessary because glass is a very poor conductor of heat and it takes time to uniformly heat all areas of the mirror blank.

It has been discovered that the foregoing method of sealing a surface of a thermally crystallizable glass to another surface, particularly to another surface of a thermally crystallizable glass, avoids or minimizes to a surprising degree many of the difficult problems connected with forming seals of thermally crystallizable glasses without obtaining premature, uncontrolled and nonhomogeneous crystallization. It is believed that this method is broadly novel, as reflected in the accompanying claims.

In the first embodiment just described the sealing step is effected by heating the entire structure to a viscosity range of $10^9$ to $10^7$ poises until sealing has been effected. In a second embodiment, the subsequent nucleation and crystallization steps can be as before described in the first embodiment, but the sealing step is effected at much higher temperatures (lower glass viscosities) by employing lampworking techniques. The assembled parts are first heated to above the annealing point temperature to avoid thermal shock in the lampworking step. By lampworking is meant application of heat to the local areas to be sealed until the surface portions only of the glass are heated to a low viscosity, such as from $10^6$ to about $10^2$ poises, and then placing the parts in contact so that immediate bonding is effected. Local application of heat can be, for instance, by means of gas flames arranged in patterns to heat only the portions in the immediate sealing areas. After the local surface portions have become hot enough to immediately seal, they are placed in contact and the seal is effected. The sealed parts are then allowed to cool and the nucleation and crystallization steps are carried out in one of the ways before described with respect to the first embodiment. One advantage of this method is that the relatively great mass of the parts automatically promotes rapid cooling of the hot, sealed portions by conduction.

While much longer over-all heat treatment times are usually involved when operating isothermally, it is possible to carry out the entire process of sealing, nucleation and crystallization essentially isothermally. In this third embodiment, the required time is necessarily longer, as it is necessary to use a much lower temperature than that of glass at $10^8$ poises viscosity because the rate of nucleation at such high temperatures is very low or substantially zero. In this "isothermal" method, a useful temperature is that corresponding to a viscosity of about $10^{11.5}$ poises, or in the range of temperatures corresponding to a viscosity of about $10^{10}$ down to about $10^{14}$ poises. In any event, the temperature must be such that it is possible to effect sealing and also nucleation of the glass at the one temperature. After the bonding has been effected, with concomitant nucleation, heating can be continued at the same temperature for as long as necessary to crystallize the glass until it has a desired expansion, preferably near zero. On the other hand, it is also possible and often desirable gradually to raise the temperature after sealing and nucleation have been effected so that the crystallization is effected during the slow raising of the temperature and/or during a holding at a higher temperature plateau.

One reason that effecting nucleation and bonding at the relatively low temperatures described in the preceding paragraph is not usually preferred is that there is little or essentially no slumping of the parts into intimate contact at such viscosities. Obviously, only the contacting areas are bonded; in order to have large areas of mutual contact between the parts, very flat, matching surfaces must be prepared, usually by careful grinding to nearly absolute flatness. Such a procedure is obviously time-consuming and costly.

If the crystallization is effected at substantially the same low temperature as the sealing and nucleation, crystallization times can be very long, and times of 500 to 2000 hours and longer are sometimes necessary.

Telescope mirror blanks of the present invention are formed from components of special compositions, namely, thermally crystallizable glasses, and particularly those of the lithium aluminosilicate system capable of being thermally in situ crystallized to form so-called glass-ceramics, preferably transparent, having a lineal coefficient of thermal expansion which is relatively low and can be about zero. Such glass-ceramics contain as the predominant crystalline species lithium-containing crystalline phases, either as beta-eucryptite or beta-eucryptite-like crystals or as beta-spodumene or beta-spodumene-like crystals, or both, as indicated by X-ray, diffraction data. A multitude of such crystalline species, in random orientation and dispersed in a glassy matrix remaining as a result of in situ crystallization, are to be found in the glass-ceramic mirror blanks of the present invention. For a transparent mirror substantially all of the crystals of the thermally crystallized glass are of a diameter of less than about ⅓ micron measured across the largest lineal dimension of the crystals.

While glass-ceramic telescope mirror blanks made in accordance with the invention are preferably transparent, they can also be opaque. However, it is considerably less difficult to mount a transparent telescope mirror upon its mountings and insure its being in a strain-free condition than it is to mount an opaque mirror. The reason, of course, is the ability to inspect the interior of the transparent mirror during the mounting process.

Low expansion glass-ceramic telescope mirror blanks can be formed by thermal in situ crystallization of suitable thermally crystallizable base glass compositions. Compositions disclosed in Ser. No. 386,693, filed July 31, 1964, and its continuation-in-part Ser. No. 464,147, filed June 15, 1965, both assigned to the assignee of the present application, are useful in the performance of the invention. Broadly, these are thermally crystallizable glasses having a composition consisting essentially of the following components, present in the glass in the following weight percentages:

TABLE A

| Component: | Weight percent |
|---|---|
| $SiO_2$ | 56–70 |
| $Al_2O_3$ | 18–27 |
| $Li_2O$ | 3.4–4.5 |
| CaO | 0–3 |
| ZnO | 0–2 |
| $B_2O_3$ | 0–4 |
| $TiO_2$ | 0–6 |
| $ZrO_2$ | 0–3 |
| MgO | 0–3 |
| $Na_2O$ | 0–1 |
| $P_2O_5$ | 0–3 |
| $(SiO_2+Al_2O_3)$ | at least 82 |
| $(SiO_2+Al_2O_3+B_2O_3+P_2O_5)$ | 86–91 |
| $(CaO+MgO+ZnO+Na_2O)$ | 2.5–6 |
| $(SiO_2+Al_2O_3+P_2O_5+Li_2O)$ | no more than 93 |
| $TiO_2+ZrO_2$ | 2–6 | wherein the ratio of $(CaO+MgO+ZnO+Na_2O+B_2O_3)$ to $Li_2O$ is less than 2.4 and the ratio of $SiO_2$ to $Al_2O_3$ is no more than 3.8.

Specific compositions of thermally crystallizable glasses useful in the performance of the present invention and coming within the above composition range are Examples 36, 37, 39–49, inclusive, and Examples H through M, described in Tables VIII and VIIIA of the aforesaid application Ser. No. 464,147, which examples are incorporated herein by reference.

In the embodiment where sealing is effected at a temperature higher than the nucleation step, and where the parts to be sealed are massive, care must be taken in choosing compositions from among the species of composition range set forth in the application mentioned. Thus, if the structural parts in FIGS. 1 to 3 are, say, four inches or more thick, for example, the compositions should have a relatively low rate of nucleation or "nuclei" formation, as well as a low rate of bulk crystal growth.

The reasons for the necessity of low rates of nucleation and bulk crystal growth in this embodiment are several. First, when the glass parts are cooled prior to assembly, even quickly, nuclei will form and even grow to a size which will not redissolve in the rapid heating step to the fusion temperature, if the rate of nuclei formation is too high. Then more nuclei could form when passing through the range of temperatures for high rates of nuclei formation (corresponding to about $10^{12}$ to $10^{11}$ poises for instance). If this happens, crystals can form too quickly to allow time for glass-to-glass fusion, since this fusion is usually effected at temperatures where crystal growth rates are near their maximum for a given glass.

Also, the crystal growth rate must be relatively low even if the nuclei formation rates of the bulk glass is low because, as is well known, glass crystallizes more easily on the surface than elsewhere, because of energy considerations at the surface or because of surface impurities from the ambient atmosphere, etc. Formation of surface crystals also impedes the making of a proper glass-to-glass seal.

Another problem is that, even after the seal is successfully effected at a temperature corresponding for instance to a temperature where the viscosity is about $10^8$ poises, the sealed and massive structure must be cooled down to the temperature range where the nuclei formation rate is significantly high and the crystal growth rate is quite low. Because of the large thickness of the parts in the structure, this cooling cannot be effected as rapidly as would be desired, and crystallization will take place (after a few nuclei form) while cooling from the sealing temperature down to the desired nucleation temperature step range, resulting in undesirably large crystals, opaque bodies or nonuniformly crystallized products. Thus, while cooling, the interior remains hotter longer than portions near the surface, and this can result in nonuniform coefficients of expansion through a cross-section of a given structural member, because of nonuniform crystallization and premature crystallization in the interior hotter portions of the mirror, unless the glass is both slow to nucleate and slow in growing crystals.

In order to limit the rates of nucleation and crystal growth, especially for sealing relatively massive parts in this high temperature sealing embodiment, it is preferred to limit the compositions used within the broad range set forth hereinbefore to those compositions consisting essentially of the following:

TABLE B

| Component: | Weight percent |
|---|---|
| $SiO_2$ | 56–70 |
| $Al_2O_3$ | 18–27 |
| $Li_2O$ | 3.4–4.5 |
| CaO | 0–3 |
| ZnO | 0–<0.5 |
| $B_2O_3$ | 0–4 |
| $TiO_2$ | 0–2 |
| $ZrO_2$ | 0–3 |
| MgO | 0–3 |
| $Na_2O$ | 0–1 |
| $P_2O_5$ | 0–<1.5 |
| $(SiO_2+Al_2O_3)$ | at least 82 |

TABLE B—Continued

| Component: | Weight percent |
|---|---|
| (SiO$_2$+Al$_2$O$_3$+B$_2$O$_3$+P$_2$O$_5$) | 86–91 |
| (CaO+MgO+ZnO+Na$_2$O) | 2.5–6 |
| (SiO$_2$+Al$_2$O$_3$+P$_2$O$_5$+Li$_2$O) | no more than 93 |
| TiO$_2$+ZrO$_2$ | 2–3.5 | wherein the ratio of (CaO+MgO+ZnO+Na$_2$O+B$_2$O$_3$) to Li$_2$O is less than 2.4 and the ratio of SiO$_2$ to Al$_2$O$_3$ is no more than 3.8.

Even more preferably, in the compositions given above, the TiO$_2$ is 0–1.5 weight percent, and the total of TiO$_2$ plus ZrO$_2$ is 2–3 weight percent.

Other compositions suitable for the products and for carrying out the process of this invention are given in the specific examples.

The transparent crystallized glass-ceramic formed as mentioned above contains as the predominant crystalline species lithium containing crystalline phases selected from the group consisting of beta-eucryptite or beta-eucryptite-like crystals and beta-spodumene or beta-spodumene-like crystals or mixtures thereof as indicated by X-ray diffraction data. The resulting ceramic product contains a multitude of such crystalline species which are distributed in random orientation throughout the crystallized glass-ceramic and which are dispersed in a glassy matrix remaining as a result of the in situ crystallization. Substantially all of the crystals of this ceramic are of a diameter less than ⅓ micron measured across the largest lineal dimension of the crystals. The glass-ceramic has a lineal coefficient of thermal expansion of about $-10 \times 10^{-7}$ to $+10 \times 10^{-7}$ (0–300° C.) and preferably of about $-3$ to $3 \times 10^{-7}$, although glass-ceramics of zero expansion are readily produced.

The ultimate telescope mirror blank and telescope mirror formed therefrom has an average lineal coefficient of thermal expansion of the glass-ceramic in the range from $+10$ to $-10 \times 10^{-7}$/° C. over the range 0 to 300° C., and is preferably about zero over the range 0 to 300° C. or over the range the mirror will be subjected to during use. Furthermore, while the diameter of the crystals within the transparent ceramic is preferably less than about ⅓ micron measured along the largest lineal dimension of the crystals, it is preferred that the crystals be of a diameter less than about ¼ micron in size; the best results are evident when the diameter is less than about 1/10 micron in size.

The disclosure in the aforementioned application Ser. No. 467,147 relating to thermally crystallizable glass compositions set forth in Table A herein are incorporated herein by reference. As fully disclosed in the aforementioned pending application, the final coefficient of thermal expansion of the glass-ceramic is determined by the composition of the thermally crystallizable glass and by the particular heat treatment to which it was subjected.

The importance of the transparency resides in the fact that it facilitates grinding and polishing of the reflecting surface 14 prior to the application of the aluminum coating. However, the structure can also be made to be opaque by permitting the crystallization to continue to the point where the crystals are large enough to make the blank opaque. This can be accomplished by having the final crystallization temperature at above about 1500° F. for a long period of time or above about 1600° F. for a shorter time. The time-temperature factors depend upon the composition and its viscosity at such temperature. Some difficulties may on occasion be encountered by the presence of large crystals because of interference with the polishing and grinding of the reflecting surfaces. For example, if large crystals are removed, the surface cannot be ground to the necessary smoothness. Moreover, when an opaque structure is used, its coefficient of thermal expansion is generally much higher than that of the transparent glass-ceramic of the same composition. Therefore, care must be taken not to impart to the opaque crystallized glass a high coefficient of thermal expansion and it is preferred to have a coefficient in the range $+10$ to $-10 \times 10^{-7}$ (0–300° C.).

A mirror blank having a concave surface can be made in accordance with the process of the present invention by the usual methods involving grinding, polishing and figuring to form the desired astronomical configuration and curvature, although a mirror having a concave surface can be made at the outset. By making the reflecting surface concave at the outset, the amount of work necessary to grind, polish and figure the surface is considerably reduced. A thin coating of aluminum is then usually applied on the prepared surface in accordance with known methods, although any other suitable means to render the face surface reflectant can be employed.

The terms "beta-eucryptite crystals and beta-eucryptite-like crystals" have been used in an alternative sense. Thus, while beta-eucryptite is often thought of as a species crystal having one mole of lithia, one mole of alumina and two moles of silica, both terms are used in this application to designate crystalline species having the beta-eucryptite structure as shown by X-ray diffraction but the peaks can be shifted slightly depending on whether there is a definite aount of silica present other than exactly two moles, either more or less silica than two moles. Similarly, the terms "beta-spodumene crystals and beta-spodumene-like crystals" are used alternatively and in a generic sense, specifying crystalline species that have the crystalline structure of beta-spodumene that contains four moles of silica to one of alumina and one of lithia but with the peaks shifted somewhat when the crystalline structure contains more or less than four moles of silica. In the claims, therefore, the terms "beta-eucryptite" and "beta-spodumene" are each used in this generic sense.

EXAMPLE I

A glass composition having the following formulation is suitable for a mirror blank:

| | |
|---|---|
| SiO$_2$ | 68.4 |
| Al$_2$O$_3$ | 22 |
| CaO | 2 |
| Li$_2$O | 3.9 |
| TiO$_2$ | 1 |
| ZrO$_2$ | 1.5 |
| Na$_2$O | 0.7 |
| K$_2$O | 0.2 |
| Sb$_2$O$_3$ | 0.3 |

The molten glass is poured into suitable molds to form the slotted members 11, 12, and the two faces 10, 13, and are air quenched after formation to minimize nuclei formation. Thereafter, the component parts are assembled into the desired mirror assembly and subjected to a fusing temperature of about 1750° F. for 2 hours. Thereafter, the structure is subjected to a heat treatment at 1350° F. for 260 hours and 1600° F. for about 1 hour. It was observed that a satisfactory transparent, crystallized glass egg-crate mirror blank of nearly zero coefficient of expansion (0–300° C.) was obtained.

EXAMPLE II

The following glass is used in this example to make a mirror blank; the components are indicated in weight percent based on the total composition.

| | |
|---|---|
| SiO$_2$ | 68.1 |
| Al$_2$O$_3$ | 20.9 |
| CaO | 3.5 |
| Li$_2$O | 3.8 |
| TiO$_2$ | 1.8 |
| ZrO$_2$ | 1.5 |
| Na$_2$O | 0.1 |
| Sb$_2$O$_3$ | 0.3 |

In this example, the egg-crate and face members are formed in suitable molds and air quenched to minimize nuclei formation. Thereafter the component parts are arranged and assembled to form an egg-crate mirror blank and subjected to an isothermal heat treatment at 1425° F. (viscosity of this glass at 1435° F. is about $10^{11.5}$ poises) for a period of 1000 hours whereby fusion, nucleation and crystallization occur at the same temperature, producing a transparent, crystallized mirror blank having an average coefficient of thermal expansion (0–300° C.) of $-0.3 \times 10^{-7}$.

EXAMPLE III

The following glass was used in the example to make a small mirror blank. The components are indicated in weight percent of the total composition:

| | |
|---|---|
| $SiO_2$ | 69.3 |
| $Al_2O_3$ | 20.2 |
| CaO | 2.9 |
| $Li_2O$ | 3.8 |
| $ZrO_2$ | 2.6 |
| $P_2O_5$ | 1.2 |

A small egg-crate mirror blank of the construction shown in FIGS. 1–3 was made. Before assembly the parts were ground and polished, and the assembled parts were given the following heat treatment:

The structure was heated for one hour to 1100° F., then slowly heated to the annealing point of about 1350° F., and heating was thereafter continued at a rate of more than 10° C. per minute to 1800° F. where it was held for 2 hours. The structure was then rapidly cooled to 1350° F., where it was held for 264 hours, and then heated to 1575° F. where it was held for 144 hours. The transparent, crystallized mirror blank structure had a positive coefficient of thermal expansion (0–300° C.) of less than $10 \times 10^{-7}$/° C.

EXAMPLE IV

When Example III is repeated, but the heat treatment of 1350° F. for 264 hours followed by 1575° F. for 144 hours is changed to 1350° F. for 480 hours, followed by 1575° F. for 24 hours, the coefficient of expansion of the transparent crystallized mirror blank structure is $0.5 \times 10^{-7}$/° C.

It will be apparent from the foregoing that many advantages are inherent in the present invention. Included are low thermal expansion characteristics, excellent transparency, lightweight, high strentgh and the like. Although the drawing shows several embodiments of the present invention, it is to be noted that other embodiments can also be made according to the teachings of the present invention. Besides telescope mirror blanks, glass articles or crystallized glass articles made in accordance with the disclosed invention will find uses as curtain walls, fire doors, tank linings, where strength is a prime requisite, flooring blocks, containers, storage bins, and the like.

What is claimed is:

1. A method for forming a lightweight, low expansion, thermally crystallized glass telescope mirror blank comprising the steps of:
    assembling two thermally crystallizable glass members having surfaces of extended areas disposed in facing reationship with at least one spacing member of thermally crystallizable glass disposed therebetween and contacting each of said facing surfaces at only a small portion of the area of said facing surfaces,
    raising the temperature of the assembly to a temperature at which the viscosity of the glass is within the range of from about $10^9$ to about $10^7$ poises,
    maintaining the assembly at this temperature until said adjoining, contacting surfaces are directly fusion sealed,
    cooling the fused assembly to the nucleation temperature range of the glass wherein the glass has a viscosity of from $10^{10}$ to $10^{14}$ poises,
    maintaining said assembly within this nucleation temperature range until nucleation is substantially, completed, and
    thereafter thermally crystallizing said assembly until a thermally crystallized telescope mirror bank is formed having a coefficient of thermal expansion of from $-10$ to $+10 \times 10^{-7}$/° C. (0–300° C.).

2. The method as defined in claim 1 wherein the step of raising the temperature to where the viscosity of the glass is from about $10^9$ to about $10^7$ poises is done at the rate of more than 10° C. per minute after the assembly is first heated to at least its annealing point.

3. The method as defined in claim 1 wherein said thermal crystallization step is effected at substantially the same temperature as the nucleation step.

4. A method for forming a lightweight low expansion, thermally crystallized glass telescope mirror blank comprising the steps of:
    assembling two thermally crystallizable glass members having surfaces of extended areas disposed in facing relationship with at least one spacing member of thermally crystallizable glass disposed therebetween and contacting each of said facing surfaces at only small portions of the area of each of said facing surfaces,
    heating the assembly for a period of time within a temperature range sufficient to directly fusion seal the adjoining, contacting glass surfaces, and to concomitantly nucleate the glass, said heating being within the range where the glass has a viscosity of $10^{10}$ to $10^4$ poises,
    and thereafter thermally crystallizing said assembly until a thermally crystallized telescope mirror blank is formed having a coefficient of thermal expansion of from $-10$ to $+10 \times 10^{-7}$/° C. (0–300° C.).

5. The method as defined in claim 4 wherein at least part of said thermal crystallization step is effected at a higher temperature than the temperature of said nucleation step.

6. The method as defined in claim 4 wherein said thermal crystallization step is effected at substantially the same temperature as the nucleation step temperature.

7. The method as defined in claim 4 wherein said at least one spacing member comprises a plurality of elongated, flat members, each having a plurality of slots extending inwardly from one edge thereof, said flat members arranged in a pattern such that each slotted portion of each member is interlocked with a slotted portion of another of said members.

8. A method of sealing two thermally crystallizable glass parts together which comprises:
    holding surfaces of the respective parts in direct contact with each other,
    in a temperature range where nucleation of the glass is effected concomitantly with fusion sealing and in the temperature range where the glass has a viscosity of $10^{10}$ to $10^{14}$ poises,
    until glass-to-glass sealing and nucleation of the glass parts has been effected.

9. The method of claim 8 where said temperature range is where the glass has a viscosity of $10^{10}$ to $10^{12}$ poises.

10. The method of claim 8 wherein, after said sealing and nucleation step, the sealed parts are thermally crystallized until the average lineal coefficient of expansion of the resulting structure is in the range from $10 \times 10^{-7}$ to $-10^{-7}$/° C. over the range from zero to 300° C.

11. The method of claim 10 wherein at least part of said thermal crystallization is effected at a higher temperature than that used in the previous nucleation and sealing step.

12. The method of claim 10 wherein said thermal crystallization is effected at substantially the same temperature as used in the previous nucleation and sealing step.

13. A method comprising:
    shaping at least two glass parts from a molten thermally crystallizable glass melt,
    cooling said shaped parts to below the annealing point of the glass at a rate such that any substantial annealing of the glass is avoided and the glass is under strain, placing a surface of one of said glass parts in adjoining, contacting relation with a surface of the other glass parts, and subjecting said surfaces and said glass parts to a temperature range where nucleation of the glass is effected concomitantly with the fusion sealing of said surfaces, said temperature range being such that the viscosity of the glass is $10^{10}$ to $10^{14}$ poises.

14. A method comprising:

shaping at least two glass parts from a molten thermally crystallizable glass melt, cooling said shaped parts to below the annealing point of the glass at a rate such that any substantial annealing of the glass is avoided and the glass is under strain, placing a surface of one of said glass parts in adjoining, contacting relation with a surface of the other glass part, heating said glass parts to a temperature above the annealing point of the glass and then rapidly heating the glass parts at a rate of more than 10° C. per minute until the viscosity of the glass is from about $10^9$ to about $10^7$ poises, and maintaining the glass parts at this temperature until said adjoining, contacting surfaces are directly fusion sealed, cooling the fused glass parts to the nucleation temperature range of the glass wherein the glass has viscosity of from $10^{10}$ to $10^{14}$ poises and maintaining said fused glass parts within said nucleation temperature range until nucleation is effected and thereafter thermally crystallizing said fused glass parts.

15. A method for forming a lightweight, low expansion, thermally crystallized glass telescope mirror blank from two thermally crystallizable glass members having surfaces of extended areas disposed in facing relationship and at least one spacing member of thermally crystallizable glass disposed therebetween for fusion sealing to each of said facing surfaces at only small portions of the area of each of said facing surfaces, said method comprising the steps of heating said members at least to the annealing point of the glass, and thereafter locally heating said small portions of said extended area of each of said facing surfaces and those surface portions of said at least one spacing member which are to contact said facing surfaces to lampworking temperatures at which seals immediately form on contact of the heated parts, assembling said members as before stated with said at least one spacing member disposed between said facing members of extended area and immediately directly fusion sealing said mirror blank members by contacting said heated surface portions, cooling the fused assembly to the nucleation temperature range of the glass wherein the glass has a viscosity of from $10^{10}$ to $10^{14}$ poises, maintaining said assembly within this nucleation temperature range until nucleation is substantially completed, and thereafter thermally crystallizing said assembly until a thermally crystallized telescope mirror blank is formed having a coefficient of thermal expansion of from $-10$ to $+10 \times 10^{-7}$/° C. (0–300° C.).

16. A method of sealing a surface of a thermally crystallizable glass part to another surface comprising:

placing said surfaces in adjoining, direct contacting relationship, heating said contacting surfaces and said glass part to a temperature of at least the annealing point of the glass, rapidly raising the temperature of the surfaces and the glass part at a rate of more than 10° C. per minute to a temperature where the viscosity of the glass is from about $10^9$ to about $10^7$ poises, maintaining the glass part and the surfaces at this temperature until said adjoining, contacting surfaces are fusion sealed, and cooling said glass part and sealed surfaces at least down to a temperature at which the glass viscosity is $10^{10}$ poises at a rate effective to maintain said glass part in a vitreous state during said cooling.

17. The method as defined in claim 16 wherein said glass part and sealed surfaces are cooled to the nucleation temperature range of the glass wherein the glass has a viscosity of from $10^{10}$ to $10^{14}$ poises and are maintained at this temperature until nucleation of the glass part is effected and thereafter thermally crystallizing said glass part.

18. The method as defined in claim 16 wherein said other surface is a surface of a thermally crystallizable glass part.

19. The method as defined in claim 18 wherein said other surface is a surface of a thermally crystallizable glass part and is also nucleated and crystallized during the recited method.

20. The method of claim 19 wherein, after said sealing and nucleation step, the sealed parts are thermally crystallized until the average lineal coefficient of thermal expansion of the resulting structure is in the range of from $10 \times 10^{-7}$ to $-10 \times 10^{-7}$/° C. over the range of from zero to 300° C.

21. The method of claim 19 wherein at least part of said thermal crystallization is effected at a higher temperature than that used in the previous nucleation and sealing step.

22. The method of claim 19 wherein said thermal crystallization is effected at substantially the same temperature as used in the previous sealing and nucleating step.

23. A lightweight, low expansion thermally crystallized glass telescope mirror blank having a reflecting surface, said mirror comprising two thermally crystallized glass members having surfaces of extended areas disposed in facing relationship with at least one spacing member of thermally crystallized glass disposed therebetween and contacting each of said facing surfaces at only small portions of the area of each of said facing surfaces, said spacing member being directely fusion sealed to each of said thermally crystallized glass members, said reflecting surface being formed on an outer surface of one of said two members.

24. The telescope mirror blank defined in claim 23 wherein said mirror blank is transparent and has an average lineal coefficient of expansion within the range of $10 \times 10^{-7}$ to $-10 \times 10^{-7}$/° C. over the temperature range of from zero to 300° C.

25. The telescope mirror blank defined in claim 24 wherein said at least one spacing member comprises a grid having a plurality of spaced surfaces which are in contact with and sealed to said small portions of the area of each of said facing surfaces.

26. The telescope mirror blank defined in claim 25 wherein said grid comprises a plurality of elongated, flat members, each of said flat members having a plurality of slots extending inwardly from one edge thereof, said flat members arranged in a pattern such that each slotted portion of each member is interlocked with a slotted portion of another of said flat members.

27. A lightweight, low expansion, thermally crystallized glass telescope mirror blank comprising two thermally crystallized glass members having surfaces of extended areas disposed in facing relationship with at least one thermally crystallized spacing member disposed therebetween, said spacing member comprising a plurality of elongated, flat members, each of said flat members having a plurality of slots extending inwardly from one edge thereof, said flat members being arranged in a pattern such that each slotted portion of each member is fitted with a slotted portion of another of said flat members and contacting each of said facing surfaces at only small portions of the area of said facing surfaces, said spacing member being fusion sealed to said two members at said contacting surfaces, said mirror blank having an average lineal coefficient of thermal expansion within the range of $10 \times 10^{-7}$ to $-10 \times 10^{-7}/°$ C. over the range from zero to 300° C.

28. A lightweight, low expansion, thermally crystallized glass telescope mirror blank comprising two thermally crystallized glass members having surfaces of extended areas disposed in facing relationship with at least one thermally crystallized spacing member disposed therebetween, said spacing member comprising a plurality of flat members each of which has a single slot extending inwardly from one edge thereof, said flat member being arranged so that the slot of each member is fitted into the slot of another of said flat members, and contacting each of said facing surfaces at only small portions of the area of said facing surfaces, said spacing member being fusion sealed to said two members at said contacting surfaces, said mirror blank having an average lineal coefficient of thermal expansion within the range of $10 \times 10^{-7}$ to $-10 \times 10^{-7}/°$ C. over the range from zero to 300° C.

29. A method comprising arranging two thermally crystallizable glass members having surfaces of extended areas disposed in facing relationship with at least one spacing member of thermally crystallizable glass disposed therebetween for fusion sealing to each of said facing surfaces at only small portions of the area of each of said facing surfaces, said method comprising the steps of heating said members at least to the annealing point of the glass, and thereafter locally heating said small portions of said extended area of each of said facing surfaces and those surface portions of said at least one spacing member which are to contact said facing surfaces to lampworking temperatures at which seals immediately form on contact of the heated parts, assembling said members as before stated with said at least one spacing member disposed between said facing members of extended area, and immediately directly fusion sealing said article members by contacting said heated surface portions, cooling the fused assembly to the nucleation temperature range of the glass wherein the glass has a viscosity of from $10^{10}$ to $10^{14}$ poises, maintaining said assembly within this nucleation temperature range until nucleation is substantially completed, and thereafter thermally crystallizing said assembly until a thermally crystallized glass article is formed.

30. The telescope mirror blank defined in claim 23 wherein said mirror blank is transparent and has an average lineal coefficient within the range of $3 \times 10^{-7}$ to $-3 \times 10^{-7}/°$ C. over the temperature range from 0 to 300° C.

References Cited

UNITED STATES PATENTS

| | | | |
|---|---|---|---|
| 3,113,877 | 12/1963 | Janakirama-Rao | 65—33 XR |
| 3,157,522 | 11/1964 | Stookey | 65—33 XR |
| 3,170,805 | 2/1965 | McMillan et al. | 65—33 XR |
| 3,241,985 | 3/1966 | Kuwayama et al. | 65—33 XR |
| 3,246,972 | 4/1966 | Smith | 65—33 XR |
| 3,272,686 | 9/1966 | Smith et al. | |
| 3,279,931 | 10/1966 | Olcott | 65—33 XR |
| 3,325,266 | 6/1967 | Stong | 65—33 XR |
| 3,346,357 | 10/1967 | Baak | 65—33 XR |
| 1,888,341 | 11/1932 | Winckler | 65—37 |

FRANK W. MIGA, Primary Examiner

U.S. Cl. X.R.

65—33, 36, 43; 106—52

PO-1050
(5/69)

UNITED STATES PATENT OFFICE
CERTIFICATE OF CORRECTION

Patent No. 3,507,737      Dated   April 21, 1970

Inventor(s) R. A. Busdiecker et al

It is certified that error appears in the above-identified patent and that said Letters Patent are hereby corrected as shown below:

Column 3, line 56, delete "hated" and insert therefor --heated--;

Column 13, line 60, delete "reationship" and insert therefor --relationship--;

Column 14, line 28, delete "$10^4$" and insert therefor --$10^{14}$--;

Column 14, line 62, delete "$-10^{-7}/°C.$" and insert therefor -- $-10 \times 10^{-7}/°C$--

SIGNED AND
SEALED
SEP 8 - 1970

(SEAL)
Attest:

Edward M. Fletcher, Jr.
Attesting Officer

WILLIAM E. SCHUYLER, JR.
Commissioner of Patents

UNITED STATES PATENT OFFICE
CERTIFICATE OF CORRECTION

Patent No. 3,507,737                    Dated April 21, 1970

Inventor(s) Robert A. Busdiecker et al

It is certified that error appears in the above-identified patent and that said Letters Patent are hereby corrected as shown below:

Change the title as follows:

"ART OF SEALING THERMALLY CRYSTALLIZABLE GLASS, AND THERMALLY CRYSTALLIZED TELESCOPE MIRROR BLANK".

In the "Abstract of the Disclosure", col. 1, in line 1, change "crystallizable" to -- crystallized -- .

SIGNED AND
SEALED
DEC 1 - 1970

(SEAL)
Attest:

Edward M. Fletcher, Jr.
Attesting Officer

WILLIAM E. SCHUYLER, JR.
Commissioner of Patents